United States Patent [19]
Fell

[11] 3,958,296
[45] May 25, 1976

[54] AIR FILTER CLEANER

[76] Inventor: Albert J. Fell, 1450 West Chester Pike, West Chester, Pa. 19380

[22] Filed: Feb. 19, 1975

[21] Appl. No.: 551,181

[52] U.S. Cl. .................................. 15/304; 55/294; 55/302
[51] Int. Cl.² .......................................... A47L 5/14
[58] Field of Search ...................... 55/294, 302, 498; 210/355; 134/24, 37; 15/303, 304

[56] References Cited
UNITED STATES PATENTS

| | | | |
|---|---|---|---|
| 2,420,822 | 5/1947 | Hallwood | 55/302 |
| 2,591,198 | 4/1952 | Ringe | 55/294 |
| 3,060,663 | 10/1962 | Morris et al. | 55/302 |
| 3,360,907 | 1/1968 | Clark, Jr. et al. | 55/302 |
| 3,568,414 | 3/1971 | Spriggs et al. | 55/294 |
| 3,716,968 | 2/1973 | Mischke | 55/302 |

FOREIGN PATENTS OR APPLICATIONS

| | | | |
|---|---|---|---|
| 16,392 | 1911 | United Kingdom | 55/294 |

*Primary Examiner*—Bernard Nozick
*Attorney, Agent, or Firm*—Steele & Petock

[57] ABSTRACT

An air filter cleaner is disclosed which is portable and which may be used on the job site for the cleaning of air filters of heavy construction equipment. The air filter cleaner is lightweight and may easily be carried or moved by a single person. The filter is comprised of a base member and an upper member. The filter to be cleaned is inserted between the base member and the upper member. The upper member is provided with a vertically depending rotatable pipe means provided with radially directed nozzles. The pipe means is also provided with a pair of nozzles directed at an angle to the radial to provide a rotary movement to the pipe means. The air filter cleaner may be operated from air compressors readily available on the job site, such as compressors on the heavy construction equipment itself, during normally scheduled down times such as lunch hours.

The purpose of the above abstract is to provide a nonlegal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

5 Claims, 5 Drawing Figures

AIR FILTER CLEANER

BACKGROUND OF THE INVENTION

The present invention is directed to an air filter cleaner. More particularly, the present invention is directed to an air filter cleaner which may be used on a job site to clean the air filters of construction equipment and vehicles during normally scheduled down times.

Most heavy construction equipment is powered by diesel engines. Diesel engines and other fuel engines on heavy construction equipment require air filters to ensure that the air taken into the engine is clean even though the construction equipment may be operated in a very dusty and dirty environment. These filters are usually of an annular or cylindrical shape.

In the past, these air filter elements were either cleaned by a process of spraying the filters with water and compressed air from hoses in combination with soaking the filter in a container of water. This process was very time consuming and costly in terms of the amount paid by a contractor to a mechanic or other person to have a filter cleaned. This manual cleaning of the filter also often resulted in pinholes or other damage to the pleated material of the filter. If the pleated material of the filter were damaged, the filter would be useless and the time invested in the cleaning of the filter would be a complete loss. Therefore, in view of these hazards and the high cost of labor, contractors and other users of the heavy equipment usually replaced the filter with a new filter without any attempt being made at cleaning a used filter even though the filters are expensive.

The present invention eliminates the problems previously encountered. The present invention enables the daily cleaning of filters on heavy construction equipment during normally scheduled down times, such as lunch hours. With the use of the present invention, the air filters may be cleaned on a daily basis before the dust and dirt becomes heavy and compacted on the filter. Therefore, the filter is not damaged during cleaning and the life of the filter is greatly increased.

Machines have been known in the prior art for use in cleaning air filters. For example, U.S. Pat. No. 3,688,780 and U.S. Pat. No. 3,620,234, both naming Herbert L. Everroad as the inventor, disclose a large machine for cleaning air filters in which water and air is sprayed through the filter. However, the machine disclosed by Everroad is a large machine requiring a compressed air and water supply for the cleaning of filters. The Everroad machine is not adapted to be used as an on the job site portable air filter cleaning device.

SUMMARY OF THE INVENTION

An advantage of the present invention is that it provides an air filter cleaner which is lightweight, portable and which is inexpensive to manufacture and use.

Another advantage of the present invention is that the air filter cleaner of the present invention may be used on a daily basis during normally scheduled down times on the job site where the heavy equipment is used.

Another advantage of the present invention is that the air filter of the present invention may be used on a daily basis thereby keeping the filter clean and providing more and cleaner air to the diesel engines thereby providing a longer life for the diesel engines.

Still another advantage of the present invention is that the air filter cleaner of the present invention may be operated by compressors already available on the heavy equipment, such as air brake compressors.

Still another advantage of the present invention is that additional down time is not needed for the cleaning of filters since the air filter cleaner of the present invention may be operated during lunch hour without the need of operator or maintenance personnel assistance.

Still another advantage of the present invention is that the daily cleaning of an air filter by use of the present invention reduces the accumulation of dust and dirt on the air filter and thereby reduces the time necessary for a thorough cleaning of an air filter on a weekly or monthly basis.

Briefly and basically, a portable air filter cleaner is provided in accordance with the present invention for the cleaning of annular air filters. The portable air filter cleaner of the present invention comprises a base closure member and an upper closure member with a pipe means rotatably mounted substantially the upper member and within the filter to be cleaned by means of a rotatable sealed joint. The pipe means is provided with at least one radially directed nozzle and at least one nozzle directed at an angle to the radial in the plane formed by revolution of a radial about the pipe means. A rotation stabilizing means is mounted on the base member for receiving the lower end of the pipe means and stabilizing its rotation. Means is provided for connecting compressed air to the pipe means through the upper closure member. Also means for maintaining the base member and upper member in contact with an air filter to be cleaned is provided.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF A PREFERRED EMBODIMENT

Figure 1:
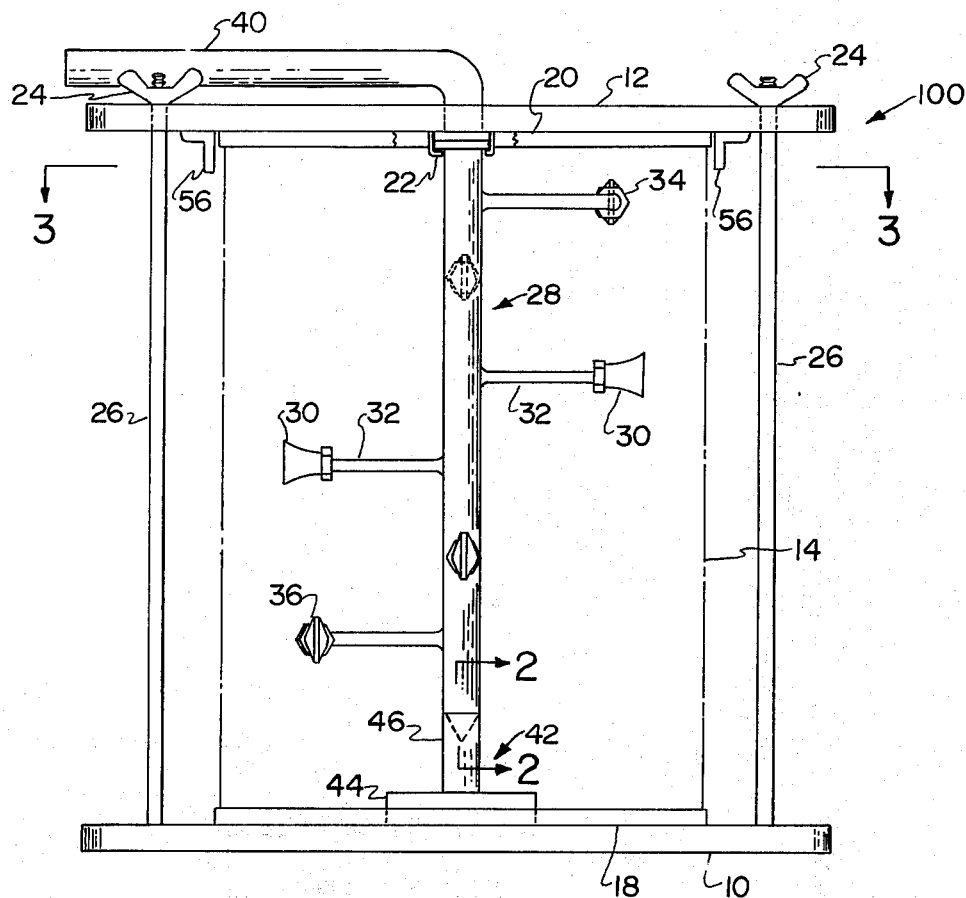
FIG. 1 is a side elevation view of an air filter cleaner in accordance with the present invention.
Figure 4:
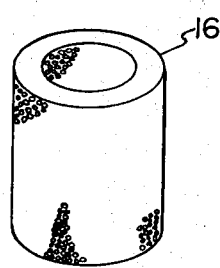
FIG. 4 is a view in perspective of an air filter which may be cleaned by the apparatus of the present invention.

Referring now to the drawings in detail, wherein like numerals indicate like elements, there is shown in FIG. 1 a portable air filter cleaner 100 in accordance with the present invention. Air filter cleaner 100 includes a base member 10 and an upper member 12. A filter to be cleaned is shown in phantom at 14. A better view of a typical filter which may be cleaned by the apparatus of the present invention is shown at 16 in FIG. 4.

Base member 10 is provided with a resilient annular seal 18. Upper member 12 is provided with a resilient annular seal 20 which is partially broken away to show rotatable sealed joint 22. The annular resilient seals 18 and 20 may be made of any suitable resilient material such as rubber. The resilient seals 18 and 20 provide an air tight fitting between the filter 14 and the base closure member 10 and upper closure member 12. The structure of the two closure members 10 and 12 may be described as having a continuous surface defined by an outer periphery.

The filter 14 is placed in the air filter cleaner by unscrewing wing nuts 24 from threaded rods 26. Preferably, four such wing nuts and rods may be provided. However, two wing nuts and rods would suffice and three or more than four may be used if desired. The wing nuts 24 are threadably mounted on rods 26 which are threaded at the upper ends. However, it is understood that other types of suitable fasteners may be used in place of wing nuts 24.

Figure 3:
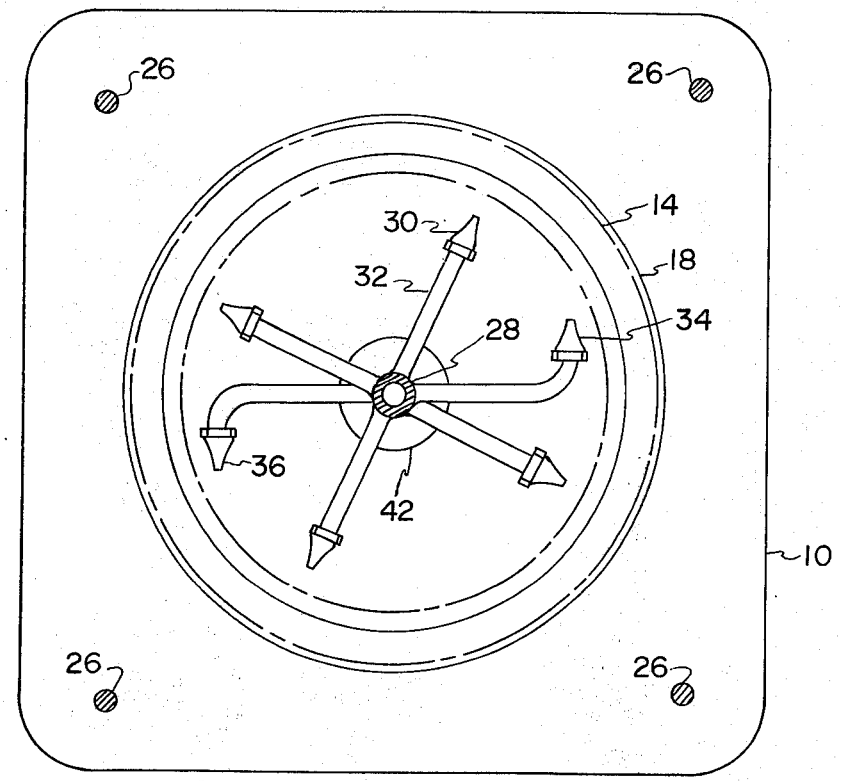
FIG. 3 is a cross-sectional view taken along line 3—3 of FIG. 1, with pipe means 28 rotated approximately 30 degrees.

Upper member 12 is provided with a pipe means 28 rotatably mounted vertically downward from the upper member 12, or substantially perpendicular to member 12, by means of rotatable sealed joint 22. Rotatable sealed joint 22 may be any suitable rotating sealed joint such as those which commonly employ nylon bushings. Pipe means 28 is provided with four radially directed nozzles mounted on radially extending tubes 32. Preferably four radially directed nozzles 30 are used with the nozzles being directed 90° apart. However it is understood that a single radially directed nozzle may be used or any suitable number of nozzles in excess of one may be used. Preferably, the nozzles are mounted on pipe means 28 and separated from each other by an equal number of radial degrees. In other words, the nozzles 30 are preferably equally spaced about pipe means 28. The arrangement of the nozzles on pipe means 28 is best seen by viewing FIGS. 1 and 3 together.

Pipe means 28 is also provided with nozzles 34 and 36. Nozzles 34 and 36 are directed at an angle to the radial in the plane formed by the radials. Preferably, as shown, nozzles 34 and 36 are directed substantially at right angles to the radials in order to provide the maximum turning force on pipe 28 when air is forced out of nozzles 34 and 36. Although a single nozzle, such as nozzle 34 or 36, may be sufficient to provide the turning motion to pipe means 28, preferably two nozzles 34 and 36 are provided. Nozzle 34 is mounted at the upper end of pipe means 28 and nozzle 36 is mounted at the lower end of pipe means 28.

Compressed air is provided to pipe or connecting means 40. Pipe or connecting means 40 may be connected to an air hose connected to the air compressor on a piece of heavy equipment on a job site. However, pipe 40 may be connected to any source of compressed air, such as a portable air compressor which may be available on the job site or elsewhere. The air from the air compressor (not shown) or other source flows through pipe or connecting means 40 pipe means 28 and out of nozzles 30, 34 and 36. The four nozzles 30 are directed radially outward and therefore provide most of the cleaning action on the air filter by causing air flow through the air filter in a direction opposite to air flow through the filter during normal use. The air flow out of nozzles 34 and 36 causes a turning motion of pipe means 28 which is enabled by rotatable joint 22.

Figure 2:
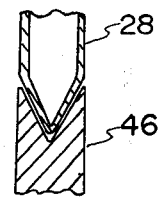
FIG. 2 is a cross-sectional view taken along line 2–2 of FIG. 1.
Figure 5:
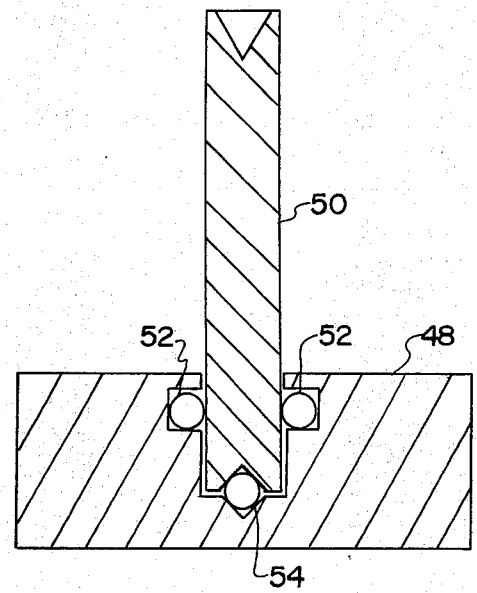
FIG. 5 is a cross-sectional view of an alternate embodiment of a rotation stabilizing means in accordance with the present invention.

Pipe means 28 is stablized in its rotation by means of rotation stabilizing means 42. Rotation stabilizing means 42 is comprised of member 46 and support member 44. As may best be seen in FIG. 2, the lower end of pipe means 28, which is sealed, rides in a conical indentation in the upper end of member 46. Member 46 may be stationary, that is, nonrotational, or it may rotate as shown in the alternate embodiment in FIG. 5. In FIG. 5, a member 50 is rotatably mounted by means of ball bearings 52 and 54 in a support member 48. The use of ball bearings 52 and 54 reduces friction and enables the rotation of pipe means 28 with significantly less turning force required from nozzles 34 and 36. Furthermore, since member 50 would rotate with member 28, friction and wear would be reduced at the lower end of pipe means 28.

L-shaped brackets 56 may be provided to aid in the centering of a filter 14 in the air filter cleaner 100. However, these brackets are not required. Furthermore, if the air filter cleaner 100 were to be used with air filters of widely varying size, it may be desirable to eliminate L-shaped brackets 56.

In operation, wing nuts 24 or other fasteners are removed from rods 26. The upper member 12 with pipe means 28 is lifted upward off of rods 26. The filter 14 to be cleaned is inserted in the air filter cleaner 100 on resilient seal 18 on base member 10. Upper member 12 is placed on top of filter 14 to be cleaned with pipe means 28 depending down through the center of filter 14 with its lower end resting in rotation stabilizing means 42. Rotation stabilizing means 42 prevents lateral movement and unwanted vibrations during operation of the air filter cleaner.

The wing nuts 24 are then tightened on rods 26. Connecting means 40 is connected to a source of compressed air, such as the air compressor on a heavy equipment vehicle on a construction job site. The compressed air passing through connecting means 40 and pipe means 28 flows out of nozzles 30, 34 and 36. The compressed air flowing out of nozzles 34 and 36 causes pipe means 28 to be rotated. The air flowing out of nozzles 30, 34 and 36 flows through filter 14 in the reverse direction of normal air flow. That is, the air flow during cleaning by air filter cleaner 100 is from the inside of the filter to the outside. The seals 18 and 20 provide an air tight seal at the top and bottom of the filter. The nozzles 30 provide the bulk of the cleaning action since they are directed radially outward and thereby provide the greatest forced air flow through filter 14. However, the nozzles 34 and 36 also provide a substantial amount of cleaning action.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. A portable air filter cleaner for cleaning an annular air filter, comprising:
   a first closure member having a continuous surface defined within an outer periphery for supporting one end of the annular shaped air filter to be cleaned, said first member being provided for substantially sealing said one end of the annular shaped air filter during cleaning;
   a second closure member having a substantially continuous surface defined within an outer periphery being mountable over the annular shaped filter to be cleaned, said second member being provided for substantially sealing the other end of the annular shaped filter during cleaning;

pipe means rotatably mounted substantially perpendicular to said second member by a rotatable sealed joint and terminating near said first member at a free end thereof, said pipe means being mounted on said second member so that it is substantially centrally located in the filter during cleaning, said pipe means being provided with a plurality of radially extending nozzles substantially equally spaced about the periphery of said pipe means, and spaced along said pipe means and at least one nozzle extending outwardly from the pipe means and including an outer portion extending at an angle to a radial in the plane formed by revolution to a radial about said pipe means to cause said pipe means to rotate;

a rotation stabilizing means mounted on said first member for receiving the free end of said pipe means and stabilizing its rotation;

means for connecting compressed air to said pipe means through said second closure member; and means for connecting said first member and said second member for contact with opposed open ends of the air filter to be cleaned.

2. A portable air filter cleaner in accordance with claim 1 including resilient annular seals mounted to said first closure member and said upper member for providing a sealed contact with an air filter to be cleaned.

3. A portable air filter cleaner in accordance with claim 1 wherein said pipe means is provided with four radially directed nozzles mounted 90° apart on said rotatable pipe means.

4. A portable air filter cleaner in accordance with claim 1 wherein said pipe means is provided with a second nozzle directed at an angle to the radial in the plane formed by revolution of a radial and 180° away from said at least one nozzle on said pipe means.

5. A portable air filter cleaner in accordance with claim 1 wherein said connecting means includes at least two rod elements extending from said first closure member to said second closure member and provided with fastening means at one of said closure members.

* * * * *